EDWIN DAYTON.
Improvement in Mortising Machines.
No. 125,123. Patented April 2, 1872.
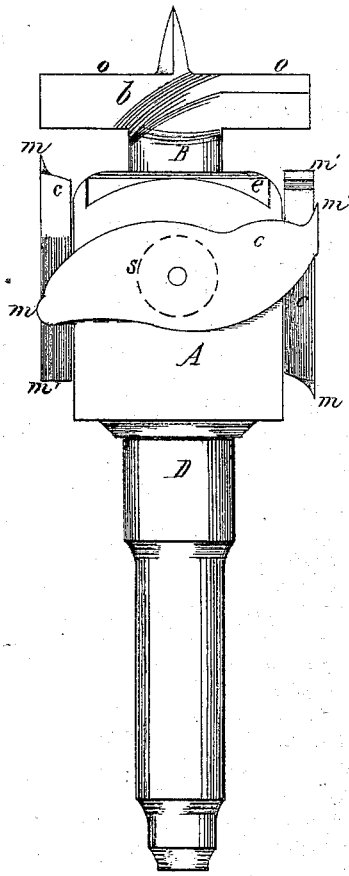
FIG. 1
FIG. 2
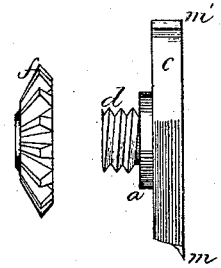
FIG. 4
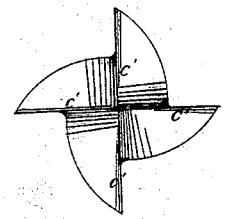
FIG. 5
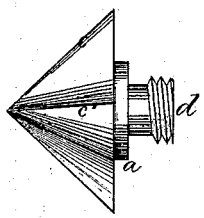
FIG. 6
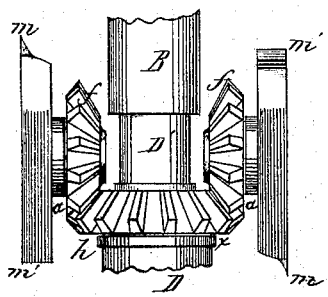
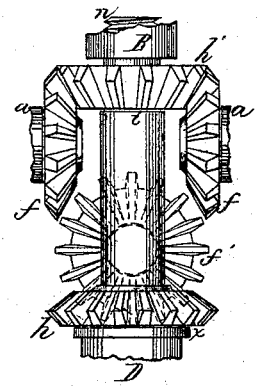
FIG. 3
Witnesses,
M. H. Belknap.
Clarence Buckland.
Edwin Dayton, Inventor,
By F. H. Curtis,
his Atty.

125,123

UNITED STATES PATENT OFFICE.

EDWIN DAYTON, OF MERIDEN, CONNECTICUT.

IMPROVEMENT IN MORTISING-MACHINES.

Specification forming part of Letters Patent No. 125,123, dated April 2, 1872.

*To all whom it may concern:*

Be it known that I, EDWIN DAYTON, of Meriden, in the county of New Haven and State of Connecticut, have invented a new and useful Machine for Making Polygonal Perforations; and I do hereby declare that the following is a full, clear, and exact description thereof, reference being had to the accompanying drawing making a part of this specification and to the letters of reference marked thereon, in which—

Figure 1 is a side view of my invention with all the parts in place. Fig. 2 is a side view of a portion of the shaft and gearing, the shell being removed to show the connection of the shaft and its gear with the cutters and their gearing. Fig. 3 is a similar view, showing another modification of the same invention. Fig. 4 is a side view of one of the cutters and its gear, showing the method of securing the same together. Fig. 5 is a front view of another modification of cutter, and Fig. 6 is a side view of the same.

My invention relates to a device for making a prismatic or many-sided hole in any material; and it consists of a shaft, upon which is fixed one or more toothed wheels which engage with other toothed wheels attached to rotary cutters, made to revolve in a direction at right angles to the plane of revolution of the gear upon said shaft. The cutters and their toothed wheels are made to operate in their proper position with reference to the toothed wheels upon the shaft by being hung in suitable bearings in a shell or case which envelops the shaft at that part where the said toothed wheels are located; and the extreme end of said shaft has a screw-thread made thereon, which fits a threaded hole made in a cutter, by means of which said cutter is secured to the end of the shaft, a perforated plate being first secured to the end of the shell, through which the shank of the cutter is inserted when screwed upon the end of the shaft. The other end of the shell is closed by being fitted closely around the shaft, leaving sufficient room for its free rotation.

That others skilled in the art may be able to make and use my invention, I will proceed to describe the same.

In the drawing, D represents the shaft, to which, near the end, is firmly secured the toothed wheel $h$, resting against the shoulder or collar $x$. This said toothed wheel may be most conveniently secured to the shaft by having a screw-thread made upon the shaft just above the shoulder $x$, and turning the same into a threaded hole made in the said wheel $h$. A shell, A, having any desirable number of sides, completely surrounds the shaft D and toothed wheel $h$, and in each side of the shell is made a hole, shown in dotted lines at $s$ in Fig. 1. The cutters $c$ may be of any desirable pattern or style, having cutting-edges $m$ and $m'$ thereon at the ends, and upon one side a projection, $d$, having a screw-thread made thereon, and between that and the cutter $c$ a collar, $a$. The toothed wheels $f$ have a central-threaded hole made therein to fit the threaded projection $d$, and when said projection $d$ is screwed into the hole in the wheels $f$ firmly up to the collar $a$, the shell A is of a thickness in each of its sides to occupy the space between the back of the wheel $f$ and the cutter $c$, with sufficient room, however, for the cutter $c$ and wheel $f$ to revolve freely. A plate, $e$, having a central hole therein of sufficient size to admit the shank B, is fitted and secured to the end of the shell A, and the part D' of the shaft D is made of a proper size, with a screw-thread upon the end, to fit into a threaded hole in the shank B of the large end cutter $b$. The shell A may be made somewhat thicker below the toothed wheel $h$, leaving a shoulder upon the inside of the shell upon which to place the said wheel $h$, when the shell is held in a vertical position with the open end up. When that is done the shaft is inserted upward through the lower end, and screwed into the toothed wheel $h$ until said wheel is firm against the shoulder $x$. The toothed wheels $f$ are then dropped into the shell with their smooth backs against the inner surface of the shell, and when dropped into place their position is shown in Fig. 2. The threaded hole in the toothed wheel $f$ and the hole through the side of the shell then coincide, and the cutters $c$ are then inserted through the holes in the shell and screwed into the toothed wheels $f$ firmly up to the collar $a$. When in this position the said collars fit properly and rotate in the said holes in the shell. After these have been secured in place the end plate $e$ is secured in place and the shank B is inserted through the hole in said plate and screwed upon the end of the shaft, and the machine is then ready for operation. Of course the screwthreads should all be so made that when the shaft D is rapidly rotated the tendency would be to screw the cutters into the toothed wheels and upon the shaft more firmly, and the wheel *h* also, by the resistance of the material against the cutters in the practical operation of the machine.

It will be seen that a shell, A, of any desirable number of sides, may be used; and the number of toothed wheels *f* and cutters should correspond with the number of sides to the shell, so that holes of any number of sides may be made, according to the number of cutters used.

In Fig. 3 is shown another modification of my invention. In the modification just described a single toothed wheel attached to the shaft D carries all the other toothed wheels attached to the cutters. In the modification shown in Fig. 3 two wheels, *h'* and *h*, are secured to the shaft, one of which, when four cutters are used, carries the two wheels *f*, and the other wheel *h* carries the two wheels *f'*. By this arrangement the strain, instead of being sustained by one toothed driving-wheel attached to the shaft, is divided between two in carrying the same number and size of cutters, and there is consequently much less liability to breakage.

Figs. 5 and 6 show a cutter of a conical form, similar to many of the wood counter-sinks now in use, *c'* being the cutting-edges.

A great variety of many-sided perforations may be made by making different combinations of the number and form of the cutters, and the machine is thus adapted to a great variety of uses, especially in wood manufactures.

It will be seen that the shell A, which, having holes in its sides, serves as a bearing for each cutter to revolve in, also serves as a protection to the machine, as all the toothed wheels and parts that would be most liable to injury from dirt and other matter, in clogging, are entirely and completely inclosed within and protected by the shell.

Having thus described my invention, what I claim as new, and desire to secure by Letters Patent, is—

The shaft D, having the end cutter *b* and one or more toothed wheels, *h*, secured thereto, and operating a series of toothed wheels, *f*, said wheels being inclosed within a prismatic shell, A, having any number of sides, which shell serves as a bearing for the rotating cutters *c* attached to said wheels *f*, the whole forming a machine for making polygonal perforations, constructed substantially as described.

Witnesses:          EDWIN DAYTON.
   T. A. CURTIS,
   CLARENCE BUCKLAND.